United States Patent [19]

Benson et al.

[11] Patent Number: 5,541,991
[45] Date of Patent: Jul. 30, 1996

[54] SYSTEM FOR SELECTIVELY PREVENTING A SOFTWARE PROGRAM FROM BEING OPERABLE

[75] Inventors: Lawrence D. Benson; Brian P. Gill; Timothy E. Gill, all of Denver, Colo.

[73] Assignee: Quark, Inc., Denver, Colo.

[21] Appl. No.: 392,024

[22] Filed: Feb. 21, 1995

Related U.S. Application Data

[63] Continuation of Ser. No. 132,782, Oct. 7, 1993, abandoned, which is a continuation of Ser. No. 732,719, Jul. 19, 1991, abandoned.

[51] Int. Cl.⁶ .............................. H04L 9/00; G06F 12/14
[52] U.S. Cl. .................. 380/4; 364/DIG. 1; 364/DIG. 2
[58] Field of Search .......................... 380/4; 364/DIG. 1, 364/DIG. 2

[56] References Cited

U.S. PATENT DOCUMENTS

| | | | |
|---|---|---|---|
| 4,924,378 | 5/1990 | Hershey et al. | 380/4 |
| 4,999,806 | 3/1991 | Chernow et al. | 380/4 |
| 5,023,907 | 6/1991 | Johnson et al. | 380/4 |
| 5,103,476 | 4/1992 | Waite et al. | 380/4 |
| 5,109,413 | 4/1992 | Comerford et al. | 380/4 |

OTHER PUBLICATIONS

DOS Mounter User's Guide; Mar. '91; pp. 5–8; Dayna Communications, Inc., Salt Lake City, Utah.

MacIntosh System Software User's Guide Version 6.0; Apple computer, Inc., 1988; Cupertino, CA; pp. 209–211.

*Primary Examiner*—Stephen C. Buczinski
*Attorney, Agent, or Firm*—Duft, Graziano & Forest, P.C.

[57] ABSTRACT

A system for selectively preventing a primary computer software program from being operable until a separate, secondary computer software program posing questions to the potential user of the primary computer software program has received answers to the questions using the keyboard of the computer. The system visually displays the questions from the secondary computer software program, determines whether the answers to the questions have been entered through the computer keyboard, verifies the format of the answers, records the answers for transmission to the software producer and then transfers the primary computer software program from a non-executable code form on one or more floppy disks to an executable code form on the hard disk drive of the computer. The user responses are recorded in some convenient form for transmittal to the company. The form of transmittal may be printed, though recording on magnetic media or transmission by other electronic means is preferable.

12 Claims, 3 Drawing Sheets

SYSTEM FOR SELECTIVELY PREVENTING A SOFTWARE PROGRAM FROM BEING OPERABLE

This application is a file wrapper continuation of application Ser. No. 08/132,782, filed Oct. 7, 1993, which is a continuation of application Ser. No. 07/732,719, filed Jul. 19, 1991 both abandoned.

BACKGROUND OF THE INVENTION

The present invention relates to a system and method for selectively preventing a software program from being operable.

Businessmen constantly seek direct communications with their customers for the purpose of understanding their customers' present and future needs, tailoring a product or service to help fulfill those needs, and providing better maintenance and follow-up service. It is often very difficult for suppliers of widely distributed products and services to ascertain the identities of their ultimate customers, and it is usually very expensive to initiate and maintain communications with those customers. Most businessmen resort to a statistical sampling survey of a small fraction of their customers or feedback from their distributors about how best to serve their potential customers.

Some companies have attempted to have customers complete various questionnaires upon purchasing a product or service, whenever a maintenance or service person visits the customer, etc. Such questionnaire techniques are perceived by the customers as a nuisance intruding upon their valuable time, are sometimes incompletely filled out, and are often misplaced.

Consequently, there is a need to obtain accurate, complete, valuable information directly from customers with a minimal inconvenience to the customer.

SUMMARY OF THE INVENTION

The present invention relates to a system and method for selectively preventing a primary computer software program from being operable until a separate, secondary computer software program posing questions to the potential user of the primary computer software program has received answers to the questions using the keyboard of the computer. The system visually displays the questions from the secondary computer software program, determines whether the answers to the questions have been entered through the computer keyboard, and then selectively permits the primary computer software program to be operable on the computer. The user responses are recorded in some convenient form for transmittal to the company. The form of transmittal may be printed, though recording on magnetic media or transmission by other electronic means is preferable.

DESCRIPTION OF A PREFERRED EMBODIMENT

The present invention relates to a system for selectively preventing a software program from being operable on a computer. In a preferred embodiment, the computer is a "Macintosh" brand, made by Apple Computer, Inc. The software application program to be selectively prevented from being operable on the Macintosh computer is the "QuarkXPress" brand electronic publishing software program produced and distributed by Quark, Inc. of Denver, Colo., U.S.A. It should be noted that a wide variety of other computers and application programs may be utilized in conjunction with the present invention. Preferably, the computer system will include an output device such as a conventional visual display screen for presenting information to a user, an input device such as a conventional keyboard, a program entry device such as a conventional floppy disk drive, and a mass storage unit such as a conventional hard disk drive.

Figure 2:
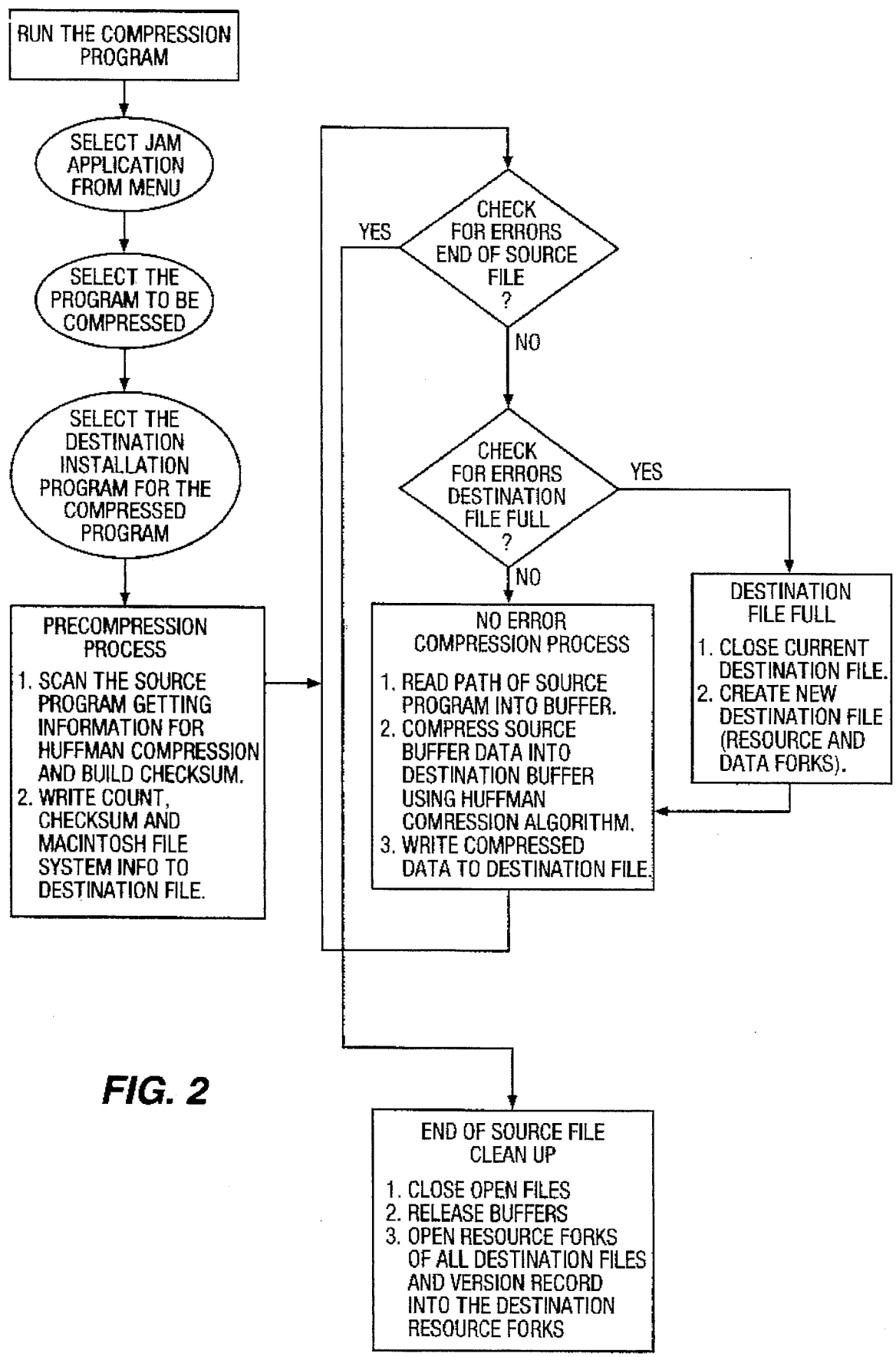
FIG. 2 is a flow chart illustrating the operation of a computer program for compressing and decompressing another computer program.

Normally, a customer can purchase application program software encoded on a magnetic disk, place the disk in the disk drive of a computer and immediately operate the program in accordance with a standard instruction or user's manual. In the present invention, the primary, or application program software is modified by placing a compressed copy of the application program into the file containing the secondary, or registration program. Compression of the application program can be achieved utilizing a variety of compression schemes such as the Huffman compression algorithm which is utilized in the embodiment described hereinafter. Additionally, a simple encryption system may be employed if the compression step is deemed unnecessary. FIG. 2 shows a flow chart illustrating the operation of the compression program. Compression of the application program into a non-executable code form prevents the application program from being operated until the application program is decompressed during installation, placing a copy of the application program in an executable code form on the user's hard disk drive. Such modification prevents the application program from being immediately operable in the computer.

Figure 1A:
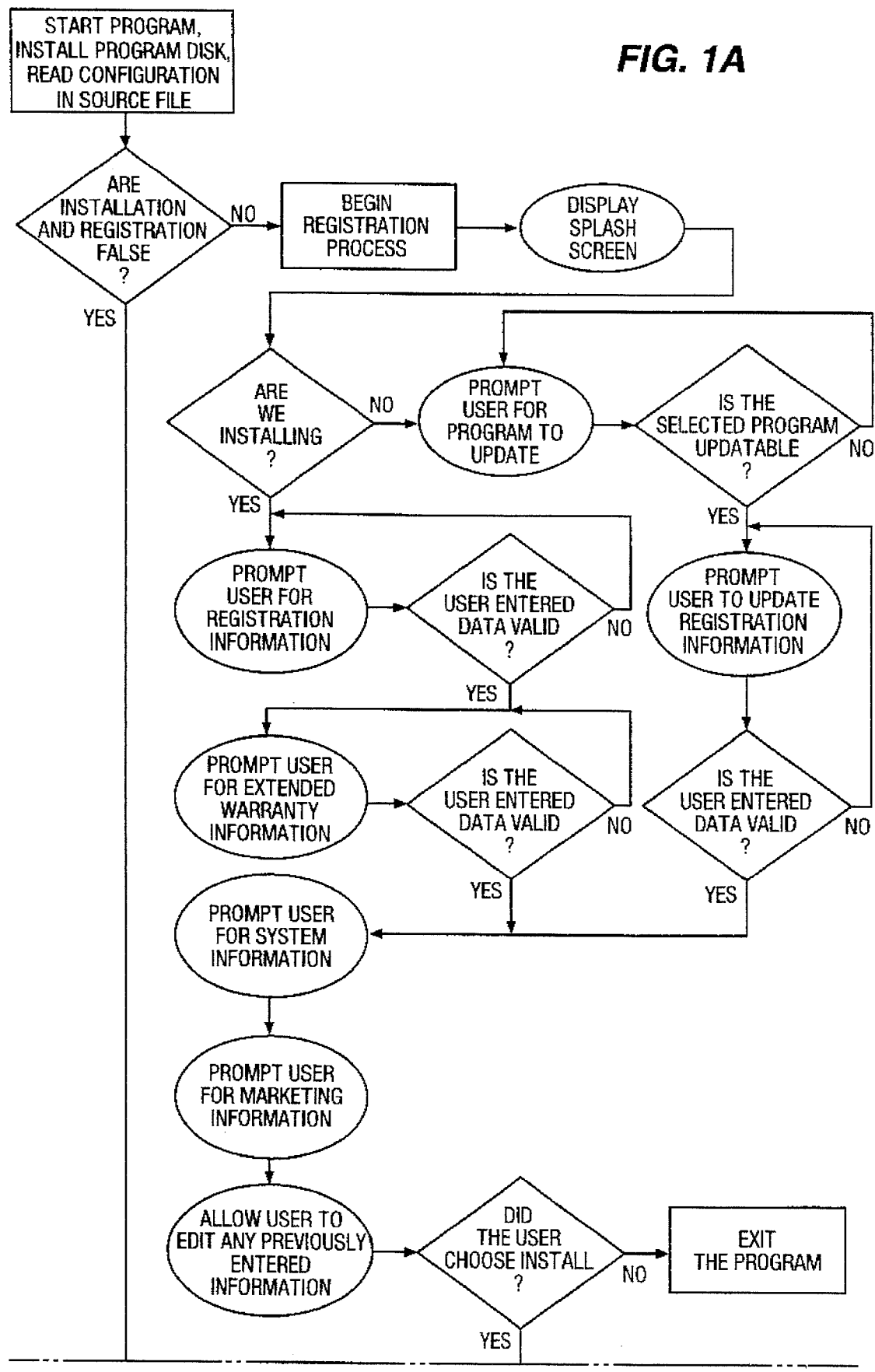
FIGS. 1A and 1B is a flow chart illustrating the method of the present invention.
Figure 1B:
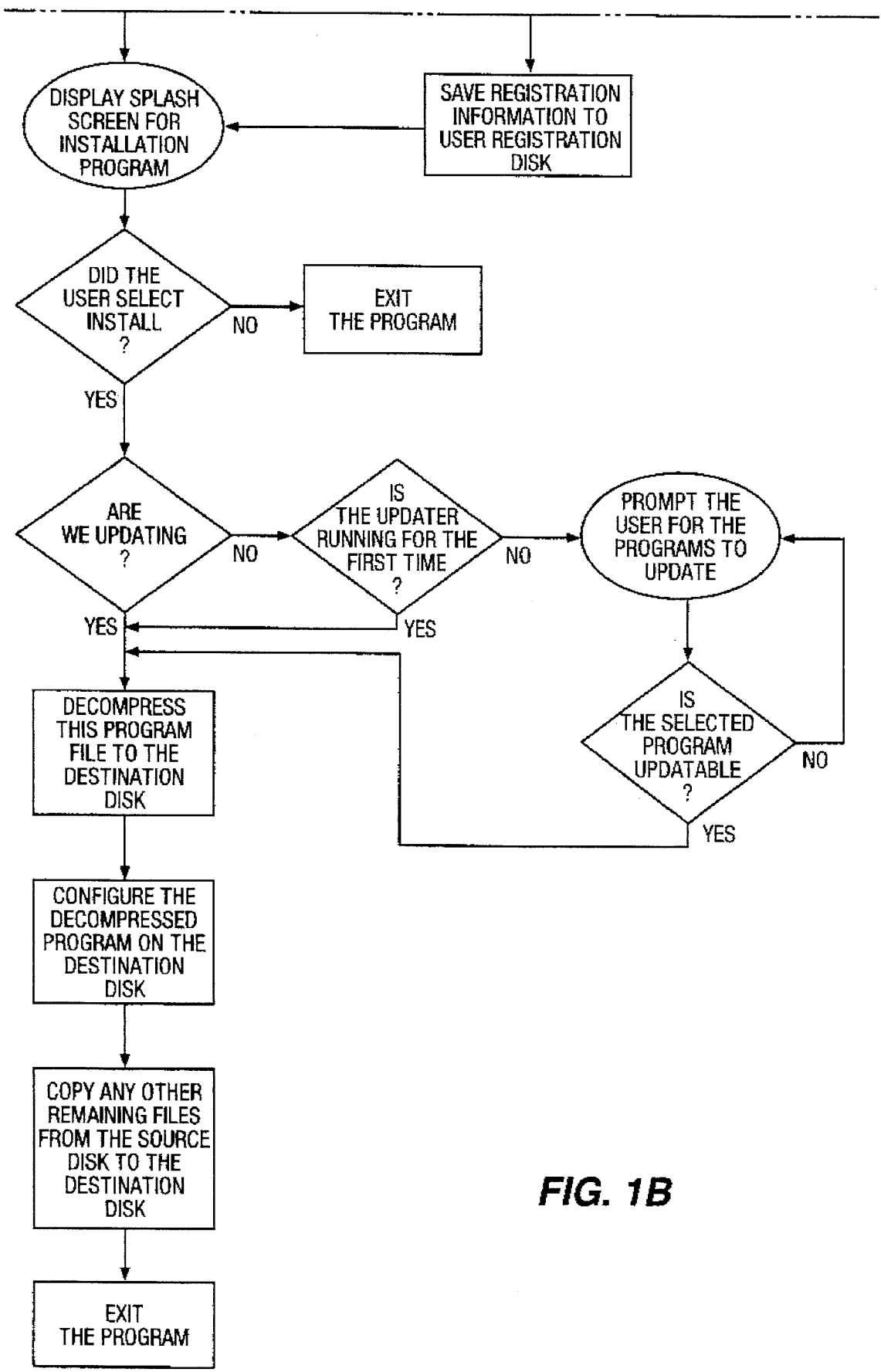

The application program may be made operable by first inserting into the computer program entry device, for example a floppy disk drive, a magnetic disk encoded with a separate software program which, for convenience, will be termed a "registration" program. It should be noted that the programs may be provided on other types of media, compatible with the particular type of program entry device of the computer system. The magnetic disk containing the registration program may be the same magnetic disk containing the application program, or a plurality of disks may be employed. As may be understood with reference to the flow chart depicted in FIGS. 1A and 1B, the registration program checks a configuration file recorded on the magnetic disk containing the registration program to determine if the application program has been previously installed. If a first time installation is detected, the registration program creates a visual display that includes a "splash" screen that tells the user of the computer about the purpose of the registration program and how to comply with the registration program in order to make the application program operable on the computer. The registration program may be utilized in conjunction with an initial installation of an application program, and also in conjunction with the updating of a particular application program upon release of a new version by the software manufacturer.

The splash screen includes a menu of categories of questions for the user to answer. For example, one category might be entitled "registration information" and questions within that category ask the user about the user's company name, address, telephone number, etc. Another category of questions might be entitled "extended warranty information" and specific questions might ask the user whether the user wants to receive maintenance services or upgrades for a certain cost for a certain period of time after the normal warranty expires, and if so, it would ask the user how payment for the maintenance costs will be made, whether by check, a particular type of credit card, etc. Still another category might be entitled "system information" and questions within that category might ask the user about the hardware components of the computer system upon which the application program is to be installed. Some system information, such as the number of serial and parallel ports, number and types of disk drives, monitor type, processor type, memory size and system B.I.O.S. date may be obtained directly from the computer system by the registration program, without user query or input. Yet another category of questions might be entitled "marketing information" and might include questions about when, from whom, and where the user purchased the application program, how the user learned about the application program, the type of business in which the user is engaged, how the user expects to use the application program, the types of other computer equipment and software programs used by the user, etc. Obviously, these type of questions are virtually limitless. Additionally, is should be noted that other formats may be utilized to elicit the specific information desired from the user. For example, the registration program may cause display of one or more forms to be filled out by the user. The registration program should be designed to minimize the inconvenience to a user and therefore should be relatively short and should be fun, like a game. The registration program directs the user to answer all of the questions or to enter specified information by use of the computer keyboard, or other input device.

The system includes means for determining whether the user has entered answers to all the questions. The registration program checks that data has been entered into all mandatory fields and then verifies that the data has been entered in a correct format, according to predetermined verification parameters in the registration program. For the application program serial number, the check sum of the serial number entered is calculated and checked for validity. Dates entered are checked against the current date for validity. Phone numbers and zip codes are checked to make sure that they are in the correct format. Credit card numbers can be checked as well.

If the means for determining whether the user has answered all the questions determines that certain questions have not been answered, then the registration program can display a message indicating what questions still need to be answered in order for the user to permit the application program to be operated on the computer. If such determining means determines that the user has answered all the questions, then a file containing all of the specified user information entered, plus system information derived from the computer, is placed on a separate "user registration" disk asked for by the registration program. After the information is written to the user registration disk, the disk is removed from the disk drive. The registration program directs the user to return the user registration disk to the producer of the program at a designated remote location. To this end, a pre-addressed disk mailer may be provided with the software package, and some incentive offered to the user for return of the user registration disk. Return of the disk to the software producer allows the specified information from a large number of users to be easily and inexpensively collated and analyzed. Alternative modes of transmission of the recorded specified information to the designated remote location may also be employed. For example, the registration program may include a communications program operative to access a computer system at the designated remote location through a modem installed in the computer system of the user of the application program. The specified information is then transmitted through the modem to the remote computer system, and the remote computer system then transmits a verification code through the modem to the registration program, allowing installation of the application program.

The registration program then activates an installation program or routine, which places a copy of the application program onto the hard disk drive of the user's computer. The installation program utilizes a decompression algorithm such that the application program is transferred from storage in a non-executable code form on a floppy disk or disks to an executable code form on the hard disk drive. The user's name and product serial number will be encoded into the copy of the application program that is placed on the hard disk drive. If the information encoded into the application program is tampered with, the application program will not operate. This feature may be implemented by initially storing a checksum value of the user information in the application program and subsequently recalculating and verifying the checksum of the user information each time the application program is run. The installation program will also place copies of all other files required for proper operation of the application program on the user's hard disk drive. The user then removes the magnetic disk containing the registration information from the computer floppy disk drive.

The user may thereafter use the application program in the normal manner. The registration program may be used to install additional copies of the application program, possibly on other computers. Such installation may or may not require answering the questions again, depending on the needs of the software manufacturer. The application program may, however, use whatever additional means deemed appropriate for further restricting its use, such as, hardware protection keys or special key disks. It may also elect to restrict the number of simultaneous uses of the application program with a given serial number (or other identifier) which are permitted in a given system of networked computers.

Although particular embodiments of the present invention have been described and illustrated herein, it should be recognized that modifications and variations may readily occur to those skilled in the art and that such modifications and variations may be made without departing from the spirit and scope of my invention. Consequently, my invention as claimed below may be practiced otherwise than as specifically described above.

We claim:

1. In a user's computer system comprising a display device, a data input device, a removable media drive, a data storage element and a central processing unit (CPU), the method of installing information on said data storage element comprising the steps of:

loading a first removable storage medium in said removable media drive, said first removable storage medium containing supplied information encoded as physical patterns in a manner which makes it unusable to said CPU;

executing an installation program on said CPU, said installation program performing the further steps of:

reading operator input by displaying at least one prompt message on said display device, said prompt message requesting registration information comprising user specific information, and accepting at least one operator response, entered by said operator using said data input device;

comparing a content of said at least one operator response to content determination parameters, indicative of acceptable user specific information, stored in said installation program;

writing said at least one operator response comprising said user specific information on to at least one writable media, excluding said first removable storage medium, selected from the class of writable media including: a second removable storage medium loaded in said removable media drive, a modem connected to said central processing unit; said supplied information being absent from said at least one writable media;

reading, in response to said comparison indicating that the content of said at least one operator response is acceptable, said encoded supplied information from said first removable storage medium;

transforming said encoded pattern of said supplied information into a physical pattern usable by said CPU; and writing said supplied information, in said usable physical pattern, onto said data storage element.

2. The method set forth in claim 1 wherein said encoding of said supplied information is performed by a technique selected from the group consisting of data encryption and data compression.

3. The method set forth in claim 1 wherein said first removable storage medium is selected from the group consisting of magnetic storage media and optical storage media.

4. The method set forth in claim 1 further comprising physically transferring said second removable storage medium to a remote location.

5. The method set forth in claim 1 wherein said installation program is present on said removable storage media containing said supplied information.

6. The method set forth in claim 1 wherein said format is selected from the group consisting of dates, postal routing codes, telephone numbers, credit card numbers, and serial numbers.

7. A system for installing electronic data in a processor which includes a display device, a data input device, a removable media drive, and a data storage element comprising:

a first removable storage medium, compatible with said removable media drive, containing supplied information to be written onto said data storage element, said supplied information encoded as physical patterns in a manner which makes it unusable by said processor;

means for prompting a human operator by displaying at least one message on said display device, said prompt message requesting registration information comprising user specific information, and accepting at least one operator response entered by said operator using said input device;

means for validating a content of said at least one operator response against content determination criteria indicative of acceptable user specific information;

means for writing said at least one operator response comprising said user specific information on to at least one writable media, excluding said first removable storage medium, selected from the class of writable media including: a second removable storage medium loaded in said removable media drive, a modem connected to said processor; said supplied information being absent from said at least one writable media; and means responsive to said validation means indicating that said at least one operator response is valid, for transforming said supplied information, read from said first removable storage medium, from said encoded pattern into a physical pattern usable by said processor and written to said data storage element.

8. A system as set forth in claim 7 wherein said encoding of said supplied information is performed by a technique selected from the group consisting of data encryption and data compression.

9. A system as set forth in claim 7 wherein said first removable storage medium is selected from the group consisting of magnetic storage media and optical storage media.

10. The method set forth in claim 7 further comprising physically transferring said second removable storage media to a remote location.

11. A system as set forth in claim 7 wherein said said means for validating a format comprises the use of one or more algorithms which describe the relationship between fields within said data.

12. A system as set forth in claim 7 wherein said format is selected from the group consisting of dates, postal routing codes, telephone numbers, credit card numbers, and serial numbers.

* * * * *